(12) United States Patent
Hickey

(10) Patent No.: US 6,223,210 B1
(45) Date of Patent: Apr. 24, 2001

(54) SYSTEM AND METHOD FOR AN AUTOMATED BROADCAST SYSTEM

(75) Inventor: Richard J. Hickey, Yorktown, NY (US)

(73) Assignee: Radio Computing Services, Inc., White Plains, NY (US)

( * ) Notice: Subject to any disclaimer, the term of this patent is extended or adjusted under 35 U.S.C. 154(b) by 0 days.

(21) Appl. No.: 09/173,467

(22) Filed: Oct. 14, 1998

(51) Int. Cl.$^7$ ................................................ G06F 13/00

(52) U.S. Cl. ................................................... 709/203

(58) Field of Search ................................. 709/200, 201, 709/202, 203

(56) References Cited

U.S. PATENT DOCUMENTS 6,012,086 * 1/2000 Lowe, II .............................. 709/218

* cited by examiner

*Primary Examiner*—Robert B. Harrell
(74) *Attorney, Agent, or Firm*—Gregory Silberman; Kaye, Scholer, Fierman Hays & Handler LLP

(57) ABSTRACT

The present invention solves deficiencies by providing, in accordance with one aspect of the present invention, a system for arranging broadcast material. This system is comprised of a storage device for storing broadcast material. The stored broadcast material comprises a track of a first type of broadcast material and a track of a second type of broadcast material. The system also comprises a log of records associated with the broadcast material in the storage device. Each record is associated with at least one of the tracks, and each record has timing information for determining the beginning of the at least one of the tracks, the end of the at least one of said tracks, a first predetermined interval subsequent to the beginning, and a second predetermined interval prior to the end. The system also comprises a sequencing device for accessing at least on of the tracks from the storage device, and playing the accessed tracks in a predetermined sequence in accordance with said timing information so that the predetermined interval prior to said end of said first type of broadcast material is timed with the predetermined interval subsequent to the beginning of the second type of broadcast material. The system also comprises a track segmenting device. The track segmenting device creates track segments. The track segment comprises a first predetermined offset added subsequent to the first predetermined interval. The track segment also comprises a second predetermined offset added prior to the second predetermined interval preceding to the end of said at least one of the tracks; so that the segments can be used for arranging tracks of broadcast material.

21 Claims, 6 Drawing Sheets

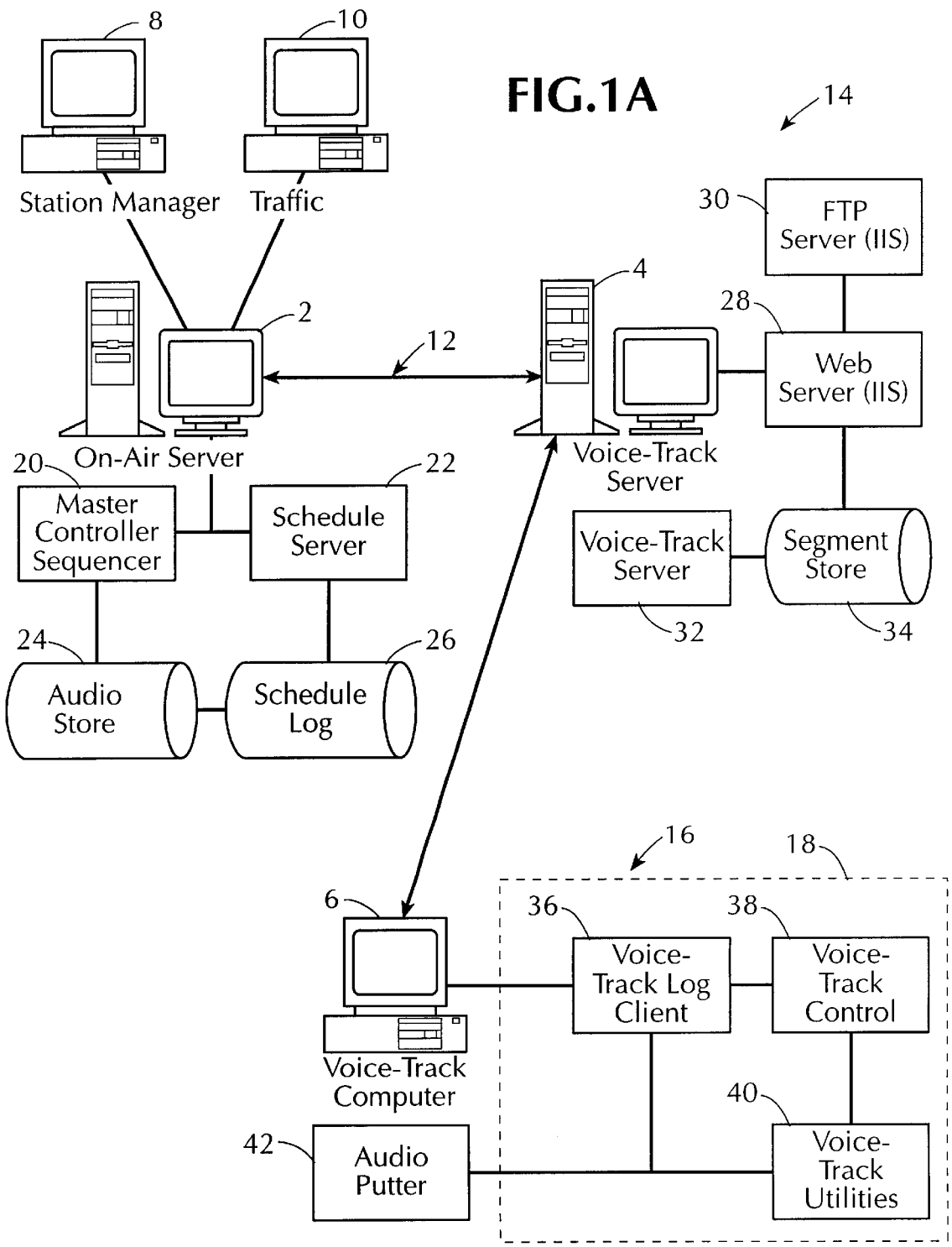

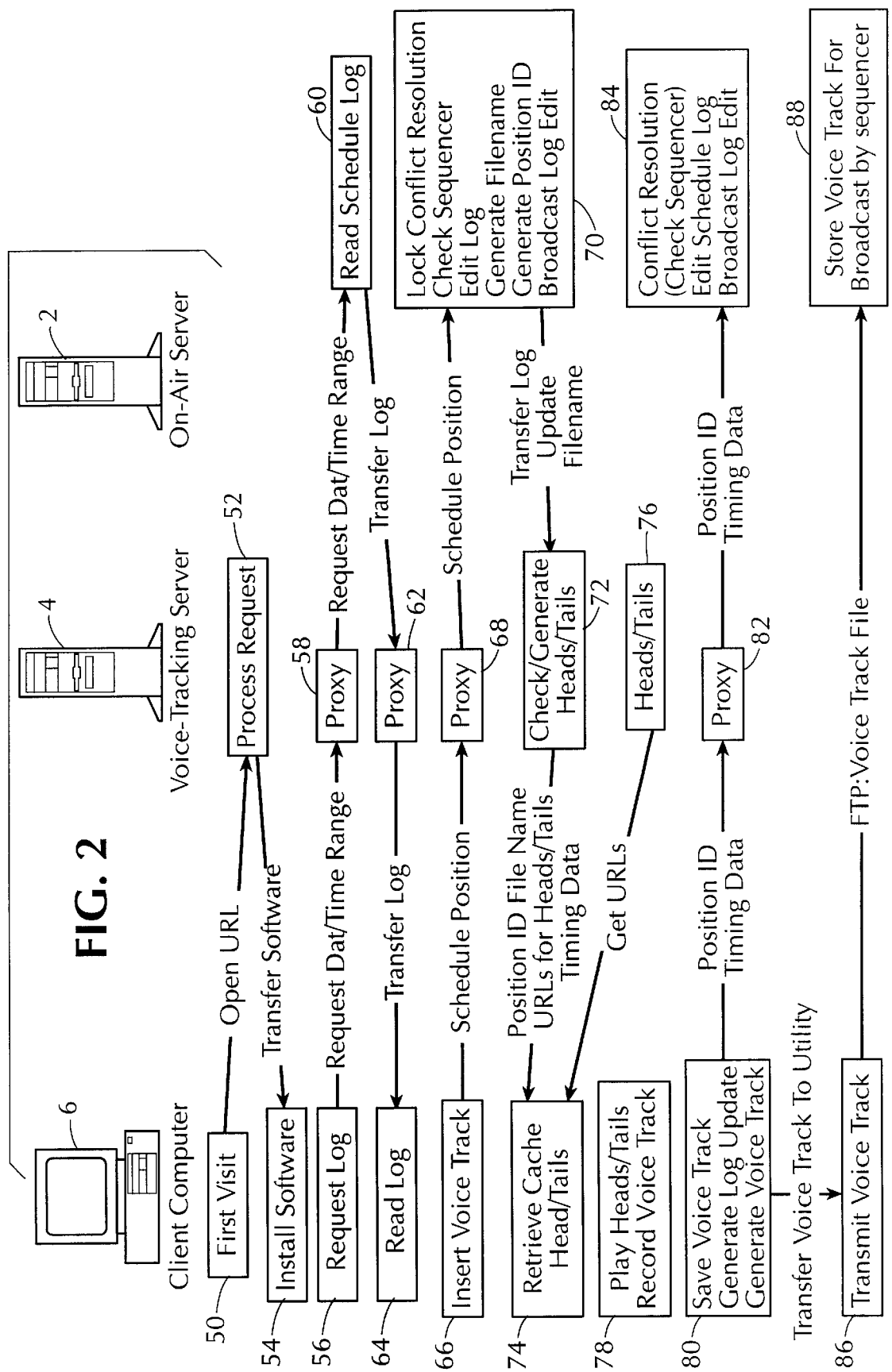

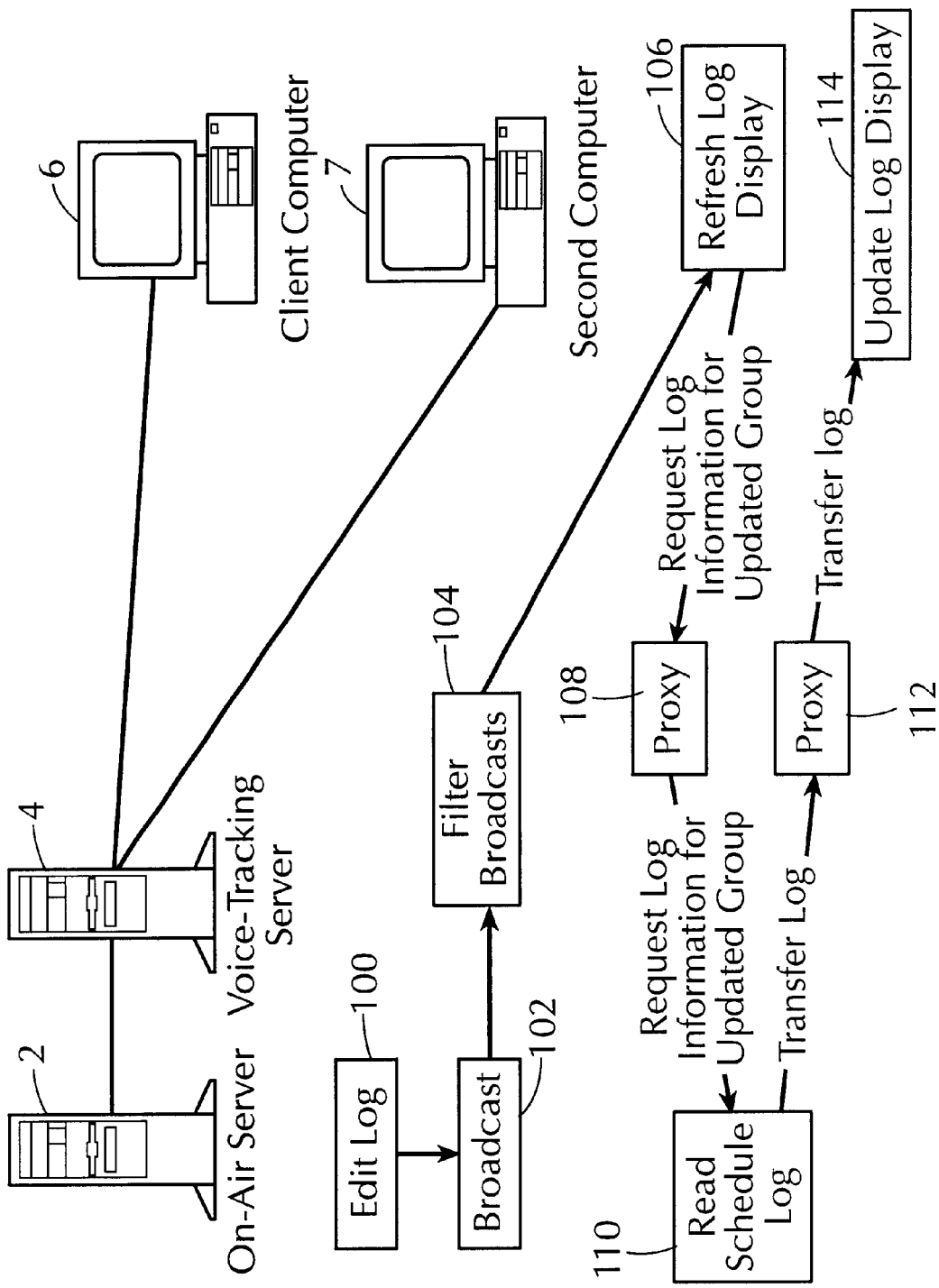

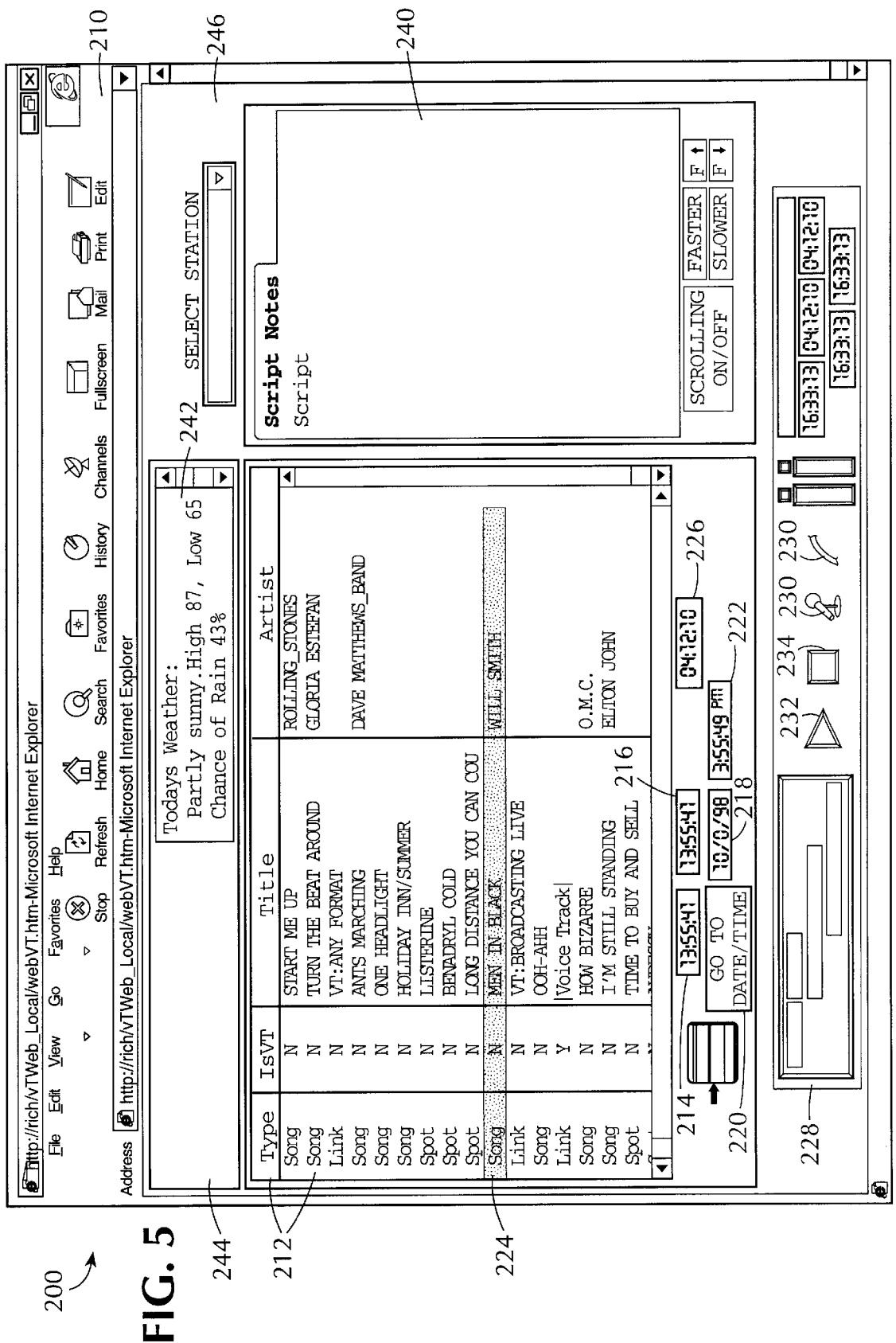

SYSTEM AND METHOD FOR AN AUTOMATED BROADCAST SYSTEM

BACKGROUND OF THE INVENTION

1. Field of the Invention

The present invention relates to a system and method for editing broadcast material arranged in a schedule. More particularly, the present invention relates to a system and method of generating and inserting voice-tracks into a broadcast schedule.

2. Background of the Invention

In its beginnings, radio broadcast programming was determined by the on-air personality (often referred to as disk-jockeys). As radio developed as an industry, broadcast programming became more structured and was dictated by the format of the radio station or a particular program. In order to facilitate and maintain the continuity of format based programming, the contents of a particular radio program were provided to the disk-jockeys as a written log. This written log provided a schedule of when particular songs and advertisements were to be played as well as when the disc-jockey was to read other copy and advertisements during the broadcast. While the task of program scheduling and generating the printed logs was eventually computerized, the actual broadcasts were still live or prerecorded in their entirety.

Today, most radio stations use computers to automate a portion, if not their entire broadcast. Many, contemporary on-air broadcasting systems now store the audio tracks (or broadcast audio files) for their broadcasts on hard disks (often referred to as the "audio store"). These tracks consist of discrete recordings of music and advertisements. The order in which the audio tracks are to be played is programmed into a schedule log which may be edited to effect changes in scheduling. The on-air broadcast system will also have a sequencer which plays the audio tracks in the order they are presented in the schedule log. Automated broadcast systems can operate with a disk-jockey present (this mode is often referred to as "live-assist") or in a completely automated fashion with no human intervention.

When broadcasts are made in a completely automated fashion, it is often desirable to add audio tracks to the log of the disk-jockeys' between song comment and/or the disk-jockey reading advertising copy as if they were present. This allows the broadcast to retain a live sound in a program that is actually prerecorded. Typically, these recordings are referred to as voice-tracks and the process of recording and inserting them into the program is referred to as voice-tracking. While voice-tracks can be recorded outside of any contextual reference other than knowing what tracks it will go between, the quality of the voice-track is improved if the individual recording the voice-track is provided with an audible reference to the preceding and subsequent tracks. The desirability of an audible contextual reference dictates that the voice-tracking system be able to reproduce a portion of the preceding and subsequent tracks. There are two primary types of voice-tracking systems in use in radio stations today, high-bandwidth systems and a low-bandwidth systems.

In the high-bandwidth systems, the voice-tracking system has a high-bandwidth connection to the on-air broadcasting system. Typically this connection is established through a local area network (LAN) with sufficient bandwidth to allow the broadcast audio files to be delivered in real-time to the voice-tracking system to provide audible context support while recording voice-tracks. As broadcast audio files are typically stored in MPEG-2 format, the connection in a high-bandwidth system must be capable of a sustained transfer rate in excess 400 kilobits per second (Kb/s). High-bandwidth systems often have direct access to the program log via direct access to the database governing the log. One of the major limitations of these systems is their high-bandwidth requirements make them unsuitable for lower bandwidth connections or crowded networks which cannot maintain the required transfer rate. These systems often require a dedicated connection to the on-air broadcasting system and employ specialized hardware to implement the voice-tracking system. The distribution of a high-bandwidth system capable of maintaining the requisite transfer rate over a wide area is technically difficult and prohibitively expensive.

This leads to the second type of voice-tracking system, low-bandwidth systems, where the network connection bandwidth is insufficient for real-time delivery of audio tracks to provide context support for voice-tracking. Typically, low-bandwidth systems establish a parallel schedule log and audio store on the machine performing the voice-tracking. Voice-tracks are recorded using the local stored copy of the schedule log and audio tracks and then the recorded voice-tracks are transmitted to the on-air server and integrated into the schedule log. As contemporary low-bandwidth systems store the audio tracks at the broadcast compression rate (typically 256 Kb/s –450 Kb/s or approximately 45 Mb–80 Mb for a three minute song) the resulting storage requirements are quite high and correspondingly expensive. The audio tracks and schedule logs must be copied or distributed on media to the voice-tracking machines on a regular basis to insure that the voice-tracking machine and the on-air machine are working from parallel audio stores and schedule logs. This requires that the relationship between the on-air broadcasting system and the voice-tracking machine be arranged in advance and therefore makes it difficult to set up a new machine as a voice-tracking source. A further limitation of contemporary low bandwidth systems is that since they are working with a copy of the schedule log and audio store, it is difficult to update the system in view of changes in the schedule log and audio store since it was last copied or distributed. The limitations of working with copies of the schedule log are compounded when multiple individuals need to coordinate access to the same time period in the schedule log because they can not see what changes the other persons have made.

A limitation which is inherent with both types of contemporary voice-tracking systems is that they require specialized hardware and specialized knowledge to configure. Yet a further limitation with contemporary voice-tracking systems is that the log schedule stored on the on-air broadcasting system can not be updated until after a log is completed and loaded into the primary audio store. This limitation is especially evident in low bandwidth systems which may require several hours to upload newly recorded voice-tracks over low-bandwidth connections and may have to reconcile several schedule log entries from several sources.

Because of these deficiencies, prior art voice-tracking systems are unable to efficiently provide voice-tracking over low-bandwidth networks without the resorting to the maintenance of a parallel schedule log and audio store. Prior art low-bandwidth systems which depend upon a parallel log are inadequate in that they do not allow for the timely update of schedule log information for either the voice-track users or the schedule log stored on the on-air broadcast system. There is a demand for a low-bandwidth voice-tracking system which does not require maintenance of a parallel log or audio store. There is a further demand for a voice-tracking system which dynamically updates the schedule log maintained by the on-air broadcast system so as to provide all users with an accurate depiction of the current broadcast programming schedule. There is a further demand for a voice-tracking system which may operate on modestly equipped personal computer without the addition of specialized hardware.

SUMMARY OF THE INVENTION

The present invention solves these deficiencies by providing, in accordance with one aspect of the present invention, a system for arranging broadcast material. This system is comprised of a storage device for storing broadcast material. The stored broadcast material comprises a track of a first type of broadcast material and a track of a second type of broadcast material. The system also comprises a log of records associated with the broadcast material in the storage device. Each record is associated with at least one of the tracks, and each record has timing information for determining the beginning of the at least one of the tracks, the end of the at least one of the tracks, a first predetermined interval subsequent to the beginning, and a second predetermined interval prior to the end. The system also comprises a sequencing device for accessing at least one of the tracks from the storage device, and playing the accessed tracks in a predetermined sequence in accordance with said timing information so that the predetermined interval prior to said end of said first type of broadcast material is timed with the predetermined interval subsequent to the beginning of the second type of broadcast material.

The system also comprises a track segmenting device. The track segmenting device creates track segments. The track segment comprises a first predetermined offset added subsequent to the first predetermined interval. The track segment also comprises a second predetermined offset added prior to the second predetermined interval preceding to the end of said at least one of the tracks; so that the segments can be used for arranging tracks of broadcast material. Another aspect of the system directed towards at least one of the segments of at least one of the tracks being compressed to a format requiring less data to represent the at least one of said segments than required to represent the at least one of the segments in an uncompressed format. Yet another aspect of the system is directed towards the track of a first type of broadcast material being a music-track and a track of said second type of broadcast material being a voice-track. The present invention is also directed towards the system being further comprised of a voice-track recorder capable of recording a new voice voice-track and a log editor capable of inserting a new record into said log, wherein said new record is associated with said new voice-track.

Another aspect of the present invention is directed towards a method for inserting a new track into a schedule of tracks. The schedule of tracks represents the order that a track from a plurality of tracks on a first computing means is scheduled to be broadcast. The method involves receiving a request for schedule information from a second computing means operatively connected to the first computing means. The method specifies transmitting at least a portion of the schedule information from the first computing means to the second computing means. The method continues with receiving a voice-track insertion point from the second computing means. In the method of the present invention, the insertion point is between a first track and a second track from the plurality of tracks The first track has an end segment and the second track has a beginning segment. The method also includes, transmitting the end segment of the first track and the beginning segment of the second track from the first computing means to the second computing means in response to the transmission of the insertion point and receiving a new track from the second computing means for insertion at the insertion point.

These and additional objects of this invention can be obtained by reference to the following detailed description of the preferred embodiments thereof in connection with the attached drawings.

BRIEF DESCRIPTION OF THE DRAWINGS

FIG. 1a is a block diagram depicting an exemplary embodiment of a system in accordance with one aspect of the invention.

FIG. 2 is a transmission/response diagram for an exemplary embodiment of a system in accordance with one aspect of the invention.

FIG. 3 is a transmission/response diagram for an asynchronous broadcast log function in an exemplary embodiment of a system in accordance with one aspect of the invention.

FIG. 5 shows an exemplary embodiment of graphical user interface for a voice-tracking system implemented within a Web browser.

DETAILED DESCRIPTION OF THE INVENTION

Figure 1B:
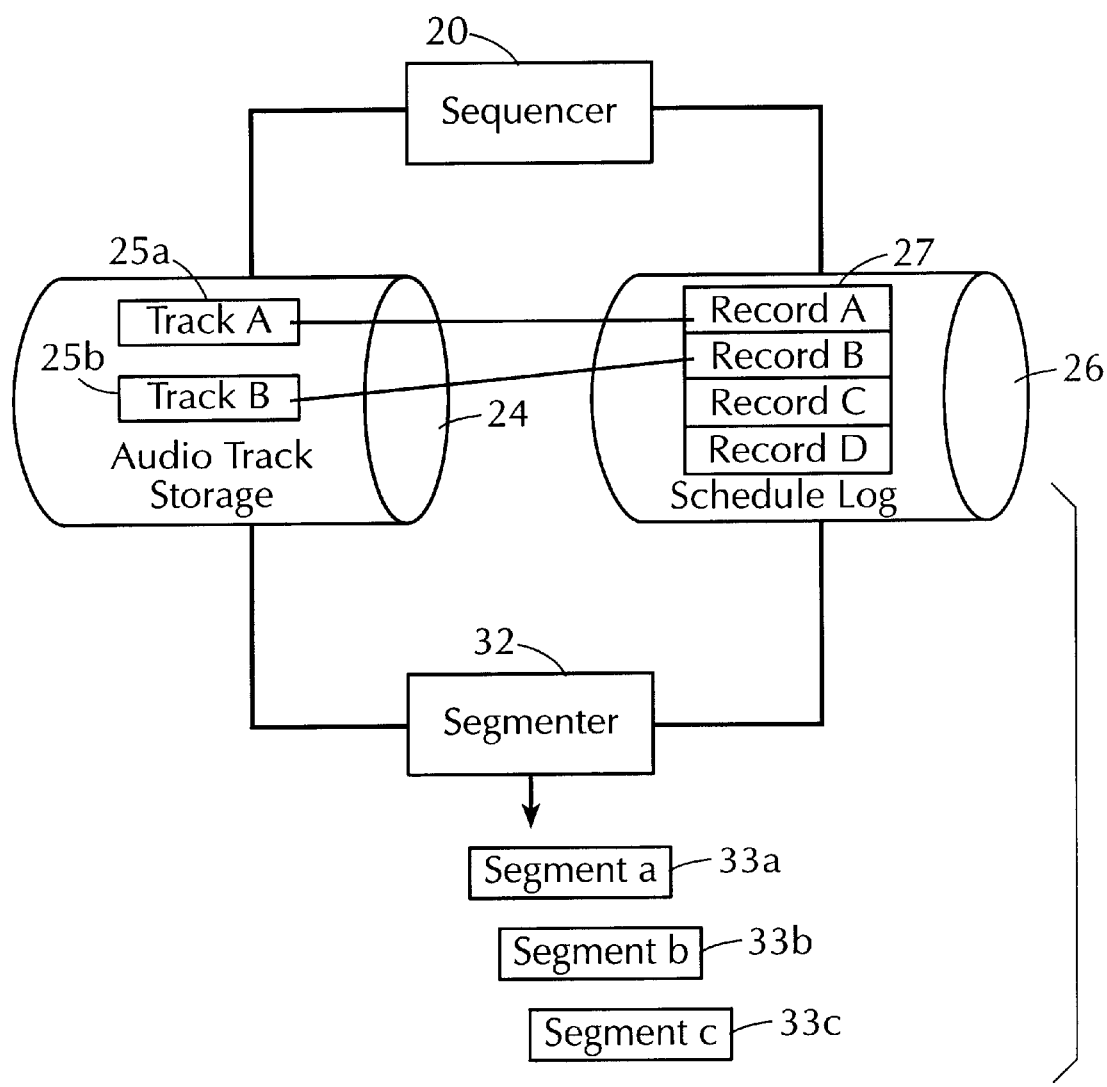
FIG. 1b is a high level depiction of an exemplary embodiment of a system in accordance with one aspect of the invention.

Referring now to FIG. 1a, there is shown a system in accordance with one aspect of the present invention. In particular, there is shown an on-air server 2 connected to a voice-tracking server 4 connected to client computer 6. Also illustrated is a station manager's computer 8 and a traffic department computer 10 connected to the on-air server 2. On-air server program modules 12 and data are stored on on-air server 2. Voice-tracking server program modules 14 and data are stored on voice-tracking server 4. Client computer program modules 16 are stored on client computer 6. A web browser 18 is also installed on client computer 6. Program modules 12, 14 and 16 are the executable computer code for implementing the present invention.

Referring to FIG. 1b, one aspect of the present invention is directed towards a system for arranging broadcast material. In particular the system is directed toward inserting a voice track into a schedule of audio tracks for broadcast. This system comprises a storage device embodied in audio store 24 for storing broadcast material 25a and 25b. The broadcast material is comprised of a number of audio tracks of different types. Some of the audio tracks embodied in the present invention are voice-tracks, music tracks and spot tracks. Spot tracks are advertisements whose audio tracks have been prepared by the respective advertisers or pre-prepared non-musical broadcast material that is not a voice-track. On air server 2 (see FIG. 1) also includes a schedule log 26. Schedule log 26 is a log of records 27 associated with the broadcast materials stored in audio store 24. Each record in the log of records is associated with at least one track of broadcast material. Each record has timing information for determining the beginning of the track, the end of the track, a predetermined interval subsequent to the beginning of the track and a predetermined interval prior to the end of the track. In one embodiment, the record includes information about the trim-in, trim-out next to play and vocal post point of the audio track. The record also includes any associated information about the track including the title, the artist if applicable), whether or not the track is a voice-track, the type of material contained in the track, whether it is a song, a link (links being voice-tracks or other audio not songs or spots) or a spot. The system also comprises a sequencing device, embodied in the present invention as sequencer 20 which accesses audio tracks from audio store 24. The sequencer plays the audio tracks at the predetermined time as scheduled in the schedule log 26. Also implemented on voice-track server is a track segmenting device. The track segmenting device is embodied in voice-track server module 32. Track segments 33a, 33b, 33c are generated in order to provide contextual support for voice-tracking and are reproduced when a voice-track recording is being made. In one embodiment the track segments are compressed to reduce the amount of bandwidth required to transfer the segments.

Referring again to FIG. 1a, in a preferred embodiment program modules 16 are downloaded to said client computer from said voice-tracking server 4. In one embodiment the program modules 16 are in a browser executable code format, for example Microsoft's ActiveX™ controls which are retained after the initial download and updated only as new controls become available. This implementation allows some of the software components with which the present invention is implemented to run outside of Web browser 18. In an alternative embodiment, the downloaded program modules are distributed in the form of Java™ applets or similar program delivery method.

On-air server 2 is further comprised of a sequencer 20, a schedule server 22, an audio store 24 and a schedule log 26. Sequencer 20 (also referred to as the master control) controls the broadcast of audio files (also referred to as audio tracks) stored in audio store 24. As these audio files are the broadcast source material, they are typically encoded in an MPEG 2 format (as defined in ISO/IEC-13818) or other similar high fidelity format. Audio store 24 is typically implemented as an array of hard drives. Schedule server 22 manages communication between the software components on on-air server 2 and voice-tracking server 4. In the preferred embodiment schedule log 26 is a database containing records of the on-air events arranged by date and time. On-air events include songs to be played, voice-tracks, advertisement, and time checks. The log records contain fields which detail pertinent information about the event. In the case where the event is a song, the schedule log 26 record is referred to as a track and will contain fields describing the title, artist, next to play point (the suggested point at which a subsequent audio track should begin over the fade out a preceding audio track), vocal post (the point at which vocals begin in a music track), trim in, trim out, intro point 1, intro point 2, intro point 3 (by convention intro point 3 is often the vocal post) and type of track or on-air event. While most often used in conjunction with radio broadcasts, on-air server 2 and the present invention are equally applicable to computer network based broadcasts such as Internet Protocol multicasting or MBONE (as described in Requests for Comments, RFC 1112 and RFC 1458).

Voice-tracking server 4 is further comprised of a web server 28, an FTP server 30, a voice-track server module 32 and a segment store 34. In one embodiment web server 28 functions are implemented with Microsoft Corporation's Internet Information Server™ (IIS 4) or other web server application package. File Transfer Protocol (FTP) server 30 functions may be provided by IIS or an alternative software component. The voice-track server module 32 manages the communication between schedule server 22 on on-air server 2 and voice-track client 36 on client computer 6. The voice-track server module 32 also manages the communication between schedule server 22 and itself for the generation of voice-track segments which are then stored in segment store 34. Segment store 34 is a storage device, typically a hard drive, which stores the beginning and end segments of audio track used to provide the person recording a voice-track with the ability to hear what his/her voice-track will sound like in the context of preceding and subsequent audio tracks ( also referred to as contextual support in voice-tracking). In one embodiment the segments (also referred to as heads and tails, wherein heads are the segments created from the beginning of a track and tails are the segments created from the end of a track) are generated from the audio store 24 in a single batch and stored for later retrieval.

The present invention is implemented on client computer 6 by Web browser 18, in which is implemented a voice-track client 36, a voice-track control 38 and a voice-track utilities module 40. Internet Explorer™ and Navigator™ are examples of two popular contemporary web browsers. The voice-track client 36 carries out the function of getting the schedule log from voice-track server. Voice-track client 36 also manages the functions of inserting and saving voice-tracks from client computer 6. Voice-track control 38 provides the audio controls to record and playback voice-tracks. Voice-track utilities module 40 retrieves the audio segments from said segment store 34 by means of an HTTP get command or other reliable transfer protocol or mechanism. Voice-track utilities module 40 is also responsible for the conversion of voice-track recordings to the proper broadcast format. Outside of browser 18, client computer 6 utilizes an audio putter module 42 to perform background upload of voice-tracks recorded on client computer 6. The upload of voice-tracks to audio store 24 is carried out via the FTP protocol and is automatically prioritized by the audio putter module 42 to transfer the voice-track files according to the date and time they will be broadcast. The audio putter module 42 also allows for the manual override of the upload schedule in order to allow a user to transfer files that may be required sooner than indicated by their broadcast date and time.

Referring now to FIG. 2, client computer 6 initiates a first visit at step 50 by opening a URL to a location on voice-track server 4. Voice-track server 4 processes the request to open the URL at step 52 and transfers software necessary for carrying out voice-tracking on a client computer. In one embodiment the client computer 6 initiates its contact with the voice-tracking server via an HTTP get to command to a URL on the voice-tracking server 4 via a Web browser. At step 54 client computer 6 installs the necessary software. The software which is transferred and installed at step 54 may be in the form of ActiveX™ controls or as Java™ applets. Once the software is installed at step 54 a user may make a request at step 56 for schedule log information for a particular date and time range from client computer 6 to voice-tracking server 4. Any time the user adjusts the date/time range, the following procedure is followed. At step 58 voice-tracking server 4 functions as a proxy and directs the request for the particular date/time range to on-air server 2. On-air server 2 reads its schedule log at step 60 and transfers the requested portion back to voice-tracking server 4. Voice-tracking server 4 again acts as a proxy and at step 62 transfers the requested portion of the log to client computer 6. At step 64 client computer 6 reads the log and displays it in a user readable format. An exemplary log display is provided in FIG. 5 Once the requested portion of the log is transferred to client computer 6 the log may be reviewed without any further transactions with voice-tracking server 4 or on-air server 2. At step 66 an insertion point for a voice-track is marked in the schedule log and the position of the insertion point is transferred to voice-tracking server 4 which functions as a proxy at step 68 and transfers the position to on-air server 2. On-air server 2 then carries out a conflict resolution procedure by checking the sequencer 20 and the schedule log 26 (see FIG. 1). If there is no conflict, the schedule server 22 creates an insertion point record in schedule log 26 indicating that a voice-track will be inserted at a specified position. Step 70 generates a file name and position ID for the specified insertion point for the voice-track. At step 70 on-air server also broadcasts the log edit to all connected servers. Log edit broadcasts notify all connected servers and non-isolated clients (station manager computer 8 and traffic computer 10) of changes to the broadcast log. Log edit broadcasts are further illustrated in FIG. 3. In FIG. 2 the only connected server is the voice-track server 4. Along with the broadcast of the log edit on-air server 2 transfers position ID and file name which are to be used to identify and save the new voice-track to voice-tracking server 4 and on-air server 2. In step 72, Voice-tracking server 4 generates a segment for the audio tracks preceding and following the insertion point of the new voice-track and stores these segments in segment store 34 (see FIG. 1). Voice-track server module 32 then transmits the position ID and file name for the voice-track to be inserted as well as URLs providing location for the segments for the preceding and following audio tracks as well as a predefined set of information and timing data for said segments. If the segments already exist in the segment store then the voice-track server module 32 does not need to regenerate the segments and will merely look up the URL associated with the desired segments and transfer them to the Voice-track client 36. At step 74 client computer 6 checks to see if it has said segments cached locally. If it does not have the required segments locally cached then it retrieves the segments by issuing an HTTP get command to the URLs provided to the client computer 6 by the voice-tracking server 4 at step 76. The voice-tracking server 4 then returns the requested segment to client computer 6. At step 78 the segments from the preceding and subsequent audio tracks are played while the new voice-track is recorded in order to provide contextual support for the voice-track recording. The audio segments are replayed at less than broadcast quality in order to reduce the amount of bandwidth they take up during transfer. The bandwidth requirement is reduced by only transferring a portion of the audio tracks and compressing the tracks using a lossy compression technique such as MPEG 3. The size of the segments is determined by the contents of the tracks from which they are derived. The actual generation of segments is rule based wherein segments are cut to a specified length of time equal to a predetermined offset before a next to play point or a predetermined offset after intro 3 (typically the vocal post). Segments are also constrained by upper and lower time limits, in one embodiment no segment can be shorter than 5 seconds or longer than 20 seconds. In one embodiment the segment determining rules are user definable and may also be configured to take available bandwidth between the client computer voice-tracking and the 6 server 4 into account. The recording of the voice-track does not generate any signals to the voice-tracking server 4 or on-air server 2 until the voice-track is saved at step 82. When the voice-track is saved a record is generated for said voice-track and its position ID and timing data to is transmitted to the voice-tracking server 4 which at step 80 functions as a proxy and transfers the position ID and timing data to on-air server 2. At step 84 on-air server 2 performs conflict resolution by checking sequencer 20 and schedule log 26 (see FIG. 1). If there are no conflicts the on-air server edits the schedule log 26 based upon the transmitted position ID and timing data. On-air server 2 at step 84 then broadcasts the log edit.

Upon saving at step 80 the voice-track is transferred to the voice-track utility 40 (See FIG. 1) and step 86 the voice-track is transferred from client computer 6 to on-air server 2. In one embodiment, the FTP protocol is used to transfer the voice-track as a background application by audio putter 42 (see FIG. 1). The audio putter 42 runs outside of browser 18 and transfers the newly created voice-track file to the audio store 24 (See FIG. 1) associated with on-air server 2. The newly recorded voice-track file is saved to the filename generated at step 70. At step 88, when the sequencer 20 (See FIG. 1) reaches the point in the schedule log 26 (See FIG. 1) it will broadcast the audio file associated with the position ID in the log and saved in audio store 24 as the filename assigned to the voice-track file.

FIG. 3 again illustrates on-air server 2 connected to voice-track server 4 which in turn is connected to client computer 6 and a second client computer 7. When an edit is made to the on-air schedule log at step 100, the on-air server 2 broadcasts the details of the edit to voice-track server 4. Voice-rack server 4 filters incoming broadcasts at step 104 and redirects the broadcast to any connected client computer for which the broadcast is relevant. Relevance is determined based upon whether or not the edit to the log has an impact on the portion of the log being viewed on the client computer. In FIG. 3, the voice-tracking server 4 directs the broadcast to a second client computer 7. This direction is response to filter criteria indicating that the portion of the log being viewed by client computer 6 is unaffected by the log edits made at step 100. At step 106 client computer 7 receives notification that a group tracks within the log currently being viewed on second client computer 7 have been impacted by a log edit at step 100. Second client computer 7 transmits a request for log information for the affected group to voice-tracking server 4. At step 108 voice-tracking server 4 functions as a proxy and directs the request for log information to on-air server 2. At step 110 on-air server 2 reads the schedule log and transfers a portion of the affected log to voice-tracking server 4. At step 112 voice-tracking server 4 functions as a proxy and directs the requested portion of the log to second client computer 7. At step 114 second client computer 7 displays the updated log.

Figure 4:
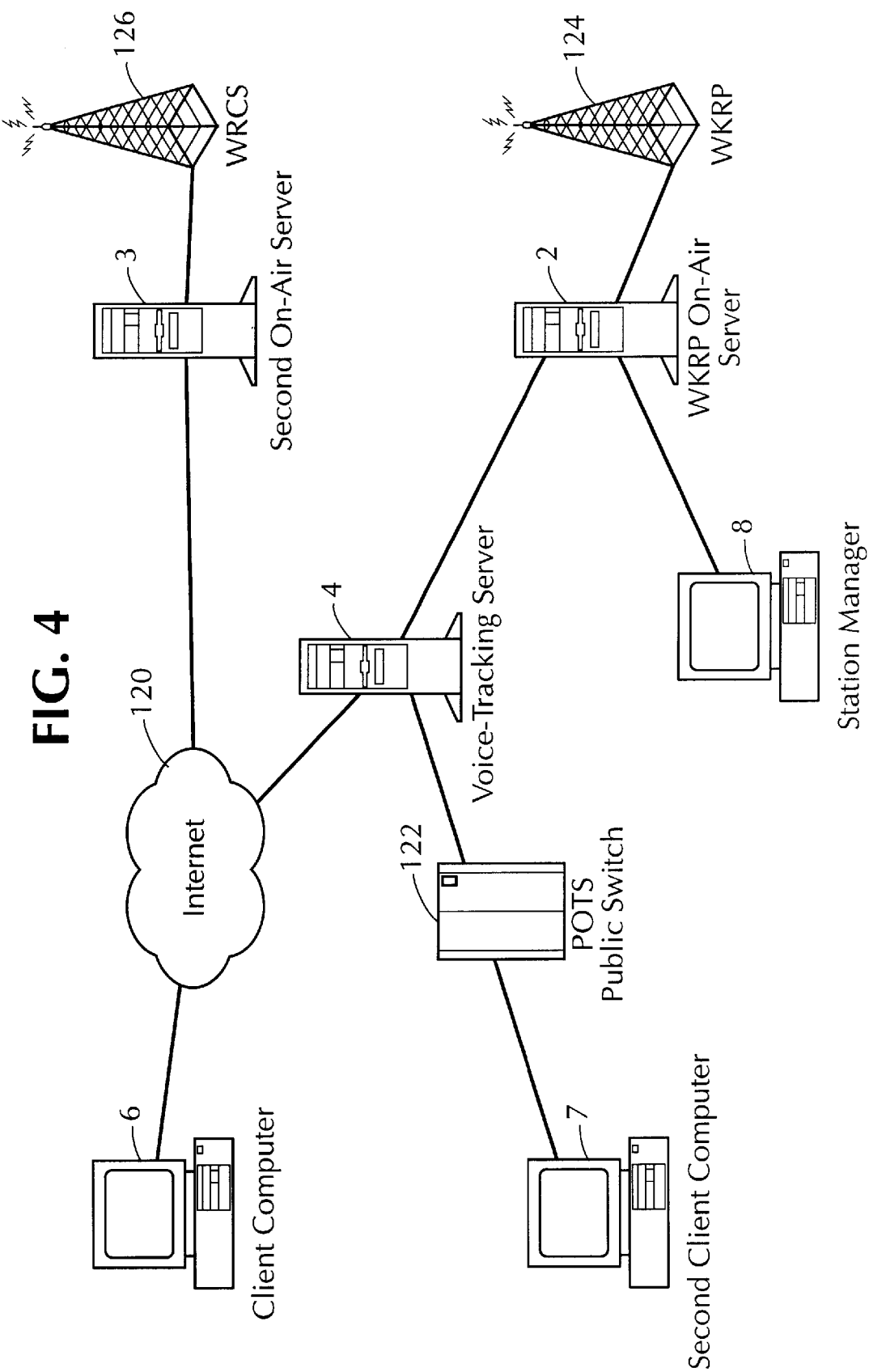
FIG. 4 is a high-level diagram depicting the network arrangement of an exemplary embodiment of a system in accordance with one aspect of the invention.

Referring to FIG. 4, client computer 6 and second client computer 7 are illustrated as being connected to voice-tracking server 4 which in turn is connected to on-air server 2 and second on-air server 3. On-air server 2 in turn is connected to the transmitter for radio station 124 and second on-air server 3 is connected to a second radio station 126. In FIG. 4 client computer 6 is connected to the voice-tracking server 4 via an internet connection 120 and client computer 2 connects to voice-tracking server 4 via a public telephone switch 122. The internet connection 120 between client computer 6 and voice-tracking server 4 is governed by the TCP/IP communication protocol. Client computer 6 may access internet 120 to connect to voice-tracking server 4, by means of an intermediate Internet service provider or a dedicated connection to the Internet backbone. A connection through an Internet service provider may be achieved either through a dial-up account or a dedicated connection. Second client computer 7 which connects to voice-tracking server 4 via a public switch 122 uses the same TCP/IP protocol as the connection going across the internet 120. In one embodiment of the present invention, the connection through public switch 122 is a RAS connection. In an alternate embodiment a client computer is connected to said voice-tracking server 4 by means of a local or wide area network.

Referring to FIG. 5, a Web browser based implementation of the present invention is generally illustrated at 200. The ActiveX or Java applets downloaded from a voice-track server to a client computer 6 and installed at step 54 (see FIG. 2) reside in browser 18 (see FIG. 1). Illustrated here is a browser window 210 from Microsoft's Internet Explorer in which is running the voice-track client software. Centrally displayed is a portion of the log 212 for a specified date and time. The specified date and time are displayed in Windows 214, 216 and 218, respectively. Control button 220 is used to select a new date and time and display 222 indicates the air-time of the currently selected track 224. The current air-time is displayed in window 226. The browser based implementation of the present invention also provides a graphic display of the audio tracks preceding and following the current voice-track at 228. A voice-track recording control is provided at 230 along with playback control 232 and stop control 234. A save control 236 is also provided and, as described above, saving a voice-track initiates a transaction with both the on-air server 2 and the voice-tracking server 4. Log display 212 also indicates type of track, whether or not it is a voice-track, the title of the track, the artist as well as other information. A display area 240 is also provided for any scripting information for radio spots to be read by the user. Song and Artist notes are also displayed in window 240 in order to provide contextual support and commentary material for intros and extros to music tracks and other broadcast tracks . Local information is displayed in window 242 and provides information relevant to the geographic location of the radio station for which the voice-tracks are being prepared. Such information might include the local traffic and weather conditions. In the illustrated embodiment the radio station is illustrated at 244 and a station selection box is provided at 246.

In the manner described above, the present invention thus provides a system and method for an automated broadcast system. While this invention has been described with reference to the preferred embodiments, other modifications will become apparent to those skilled in the art by study of the specification and drawings. It is thus intended that the following appended claims include such modifications as fall within the spirit and scope of the present invention.

What is claimed:

1. A system for arranging tracks of broadcast material comprising:
   a. a storage device for storing broadcast material wherein said broadcast material comprises a first track comprising a first type of broadcast material and a second track comprising a second type of broadcast material;
   b. a log of records associated with said broadcast material in said storage device, wherein each record is associated with at least one of said tracks, and wherein each record has timing information for determining a beginning of said at least one of said tracks, an end of said at least one of said tracks, a first predetermined interval subsequent to said beginning, and a second predetermined interval prior to said end;
   c. a sequencing device for accessing at least one of said tracks from said storage device, and playing said accessed tracks in a predetermined sequence in accordance with said timing information so that said predetermined interval prior to said end of said first type of broadcast material is timed with said predetermined interval subsequent to said beginning of said second type of broadcast material; and
   d. a track segmenting device for creating track segments; wherein a track segment comprises a first predetermined offset added subsequent to said first predetermined interval; and wherein said track segment comprises a second predetermined offset added prior to said second predetermined interval preceding to said end of said at least one of said tracks; so that said segments can be used for arranging tracks of broadcast material.

2. The system of claim 1, wherein at least one of said track segments of at least one of said tracks is compressed to a format requiring less data to represent said at least one of said segments than required to represent said at least one of said track segments in an uncompressed format.

3. The system of claim 1, wherein said track of a first type of broadcast material is a music-track and a track of said second type of broadcast material is a voice-track.

4. The system of claim 1, wherein further comprises a voice-track recorder capable of recording a new voice-track and a log editor capable of inserting a new record into said log, wherein said new record is associated with said new voice-track.

5. A method for arranging broadcast material, comprising:
   a. storing broadcast material, wherein said broadcast material comprises a first track comprising a first type of broadcast material and a second track comprising a second type of broadcast material in a storage device;
   b. associating a log of records with said broadcast material in said storage device, wherein each record is associated with at least one of said tracks, and wherein each record has timing information for determining a beginning of said at least one of said tracks, an end of said at least one of said tracks, a first predetermined interval subsequent to said beginning, and a second predetermined interval prior to said end; and
   c. creating track segments with a segmenting device, wherein said track segment comprises a first predetermined offset added subsequent to said first predetermined interval; and wherein said track segment comprises a second predetermined offset added prior to said predetermined interval; so that said track segments can be used for arranging tracks of broadcast material.

6. The method of claim 5, wherein at least one of said track segments of at least one of said tracks is compressed to a format requiring less data to represent said at least one of said track segments than required to represent said at least one of said segments in a broadcast format.

7. The method of claim 5, wherein said track of a first type of broadcast material is a music-track and a track of said second type of broadcast material is a voice-track.

8. The method of claim 5, wherein said method further comprises recording a new voice voice-track with a voice-track recorder and inserting a new record into said log with a log editor, wherein said new record is associated with said new voice-track.

9. A method on a computer, wherein said computer has a display and audio input/output means, for inserting a new track into a schedule of tracks, wherein said schedule of tracks is the order in which a plurality of tracks is scheduled to be broadcast comprising the steps of:
   a. accepting input specifying a track insertion point between a preceding track and a subsequent track of said schedule of tracks;

b. producing a predetermined segment of said preceding track and a predetermined segment of said subsequent track, wherein the sizes of said segments produced of said preceding and said subsequent tracks are determined based upon the contents of said track; and c. recording the new track for insertion at said insertion point.

10. The method of claim 9, wherein said preceding track has a first time marker a first predetermined interval prior to the end of said preceding track and said subsequent track has a second time marker placed a first predetermined interval subsequent to the beginning of said track, and wherein the size of said segments of said preceding and said subsequent tracks is determined based upon said first time marker and said second time marker.

11. The method of claim 10, wherein the size of said segment of said preceding track is equal to a second predetermined interval added to said first predetermined interval of said preceding track.

12. The method of claim 10, wherein the size of said segment of said subsequent track is equal to a third predetermined interval added to said first predetermined interval of said subsequent track.

13. The method of claim 10, wherein saving said new track generates a log update associated with said new track, wherein said log update contains timing information for determining the beginning said new track and the end of said new track.

14. The method of claim 13, wherein said log update further comprises timing information for determining a predetermined interval subsequent to said beginning of said new track and a predetermined interval prior to an end of said new track.

15. The method of claim 9, wherein said manifest record transmitted asynchronously to a second computer; wherein said second computer comprises a storage device containing a log contains data defining said schedule of tracks; wherein a log editor is edits said log in accordance with said timing information contained in said log update.

16. The method of claim 9, wherein a selectable icon is displayed on a display so that; selecting said selectable icon initiates said production of said segment of said preceding track and recording said new track; selecting said selectable icon a second time initiates said production of said segment of said subsequent track; selecting said selectable icon a third time stops production of said segments of said preceding and subsequent tracks and stops said recording of said new track.

17. A method of inserting a new track into a schedule of tracks, wherein said schedule of tracks represents an order that a track from a plurality of tracks on a first computing means is scheduled to be broadcast, comprising:

a. receiving a request for schedule information from a second computing means operatively connected to said first computing means;

b. transmitting at least a portion of said schedule information from said first computing means to said second computing means;

c. receiving a voice-track insertion point from said second computing means, wherein said insertion point is between a first track and a second track from said plurality of tracks, wherein said first track has an end segment and said second track has a beginning segment;

d. transmitting said end segment of said first track and said beginning segment of said second track from said first computing means to said second computing means in response to said transmission of said insertion point; and a. receiving a new track from said second computing means for insertion at said insertion point.

18. The method of claim 17, wherein said end segment of said first track and said beginning segment of said second track are generated by said first computing means by segmenting a predetermined amount from the end of said first track to form an end segment and segmenting a predetermined amount from the beginning of said second track to form a beginning segment and compressing said end segment of said first track and said beginning segment of said second track.

19. A method for inserting a voice track in an audio broadcast from a first computer operatively connected to a second computer, wherein said second computer controls broadcasting of audio tracks arranged according to a schedule, wherein said schedule is defined by a log stored in a storage device, comprising:

a) transmitting a request for at least a portion of said schedule from said first computer to said second computer;

b) receiving said portion of said schedule by said first computer in response to said request;

c) specifying an insertion point by said first computer wherein said insertion point represents said voice-track between a first of said audio tracks and a second of said audio tracks, wherein said first of said audio tracks has an end segment and said second of said audio tracks has a beginning segment;

d) generating a record in said log representing said insertion point by said second computer;

e) transmitting said end segment of said first audio track and said beginning segment of said second audio track from said first computer to said second computer;

f) producing said end segment of said first audio track and said beginning segment of said second audio track on said first computer when said voice-track is recorded by said first computer;

g) inserting said voice-track into said schedule; and h) transmitting said voice-track to said second computer.

20. The method of claim 19, wherein saving said voice-track initiates the generation of a log update containing data describing the contents of said voice-track; wherein said log update is transmitted asynchronously to said second server; wherein the contents of said log update define how said log is edited in response to said insertion of said voice-track into said schedule.

21. The method of claim 19, wherein specifying an insertion point at which a voice-track is to be inserted between a first audio track and a second audio track causes said the transmission of a predefined set of information associated with at least said first and said second audio tracks to be transmitted to said client computer.

* * * * *